United States Patent [19]

Hynd

[11] 4,046,546

[45] Sept. 6, 1977

[54] METHOD AND APPARATUS FOR REFINING GLASS IN A MELTING TANK

[75] Inventor: William Christie Hynd, Lymm, England

[73] Assignee: Pilkington Brothers Limited, Merseyside, England

[21] Appl. No.: 653,827

[22] Filed: Jan. 30, 1976

[30] Foreign Application Priority Data

Jan. 31, 1975 United Kingdom ............... 4360/75

[51] Int. Cl.$^2$ ............................................. C03B 5/22
[52] U.S. Cl. ........................................ 65/135; 65/136; 65/178; 65/337; 65/346
[58] Field of Search .............. 65/337, 338, 339, 136, 65/137, 178, 346, 347, 356, 341

[56] References Cited

U.S. PATENT DOCUMENTS

| | | | |
|---|---|---|---|
| 1,667,145 | 4/1928 | Diederichs | 65/137 X |
| 2,049,600 | 8/1936 | Wright | 65/347 X |
| 2,061,367 | 11/1936 | Morton | 65/337 X |
| 3,400,204 | 9/1968 | Gell | 13/6 |
| 3,498,779 | 3/1970 | Hathaway | 65/178 X |

*Primary Examiner*—Arthur D. Kellogg
*Attorney, Agent, or Firm*—Burns, Doane, Swecker & Mathis

[57] ABSTRACT

An elongated tank body of a glass melting apparatus defines a melting region adjacent its inlet end, a refining region downstream, a conditioning zone adjacent its outlet end and an intermediate zone leading from the refining region to the conditioning zone. The intermediate zone and conditioning zone are substantially narrow relative to the refining region. Flow control means physically slows up the forward flow of the upper levels of glass out of the refining region and into the narrower zones. The refining region and intermediate zone are sufficiently deep for forward and return flow of molten glass to take place. A step is located at the upstream end of the conditioning zone which has a raised base providing a shallow conditioning along which molten glass flows toward the outlet with substantially no return flow.

23 Claims, 16 Drawing Figures

METHOD AND APPARATUS FOR REFINING GLASS IN A MELTING TANK

BACKGROUND OF THE INVENTION

The present invention relates to the manufacture of glass and more particularly to a glass melting furnace and its operation.

In a known method of manufacturing glass in a continuous process, raw materials are fed in at one end of a glass melting tank to form a blanket floating on an existing bath of molten glass. The rate of feeding is sufficient to maintain a constant glass depth in the tank whilst molten glass progressively flow towards the opposite end of the tank known as the working end, from which molten glass is taken away for use in a forming process. The blanket of raw materials is converted to molten glass as it passes through a melting zone at one end of the tank by heat which may come for example from burning fuel supplied from burners situated at spaced intervals in the side walls above the glass level or from electrical heating devices. The molten glass passes from the melting zone into a refining zone where heat is also supplied above the molten glass. In the refining zone bubbles of gas still remaining in the glass are encouraged to escape or go into solution in the glass. The glass passes from the refining zone into a conditioning zone adjacent the working end of the tank. In the conditioning zone the glass is homogenised and brought to a suitable thermal condition for use in the forming process. Normally a canal leads from the working end of the tank to a forming process.

From the above, it can be seen that certain regions of the tank are defined as melting, refining and conditioning zones. As regards the molten glass passing from one zone to another, all the glass leaving any one zone may not necessarily have reached a final state for that operation e.g. a fully refined state as it enters the conditioning zone. Some refining can still occur in the conditioning zone, and conditioning may start to some extent in the refining region. Hence the zoned regions are defined to show the areas in which the greater part of all of a particular operation is carried out in a tank, and enables the man practised in the art to identify the temperature conditions required in these zones.

Conventionally heat is supplied for melting and refining the glass by the combustion of liquid or gaseous fuel above the glass surface, by electric heating within the body of the glass or by a combination of both methods; the glass in the conditioning zone is normally cooled by air blown across the free surface of the glass.

A rising temperature gradient is arranged along the melting zone of the furnace by control of the energy input along the furnace length, the temperature reaching a maximum at a so called hot spot; downstream of this position the temperature is caused to fall. The effect of these temperature gradients is to cause convection currents which return hot glass in the upper layer of the melting zone underneath the batch blanket towards the filling end, so augmenting the heat supplied to the main body of glass in the melting zone which would otherwise not be heated sufficiently as the unmelted batch forms an insulating layer which interferes with the transfer of heat to the main body of molten glass beneath. The temperature gradients also cause, downstream of the hot spot, convective flows which carry glass in the upper layers of the refining zone forwards towards the conditioning zone, returning colder glass in the lower layers of the refining zone back towards the hot spot. These convective flows serve to homogenise the glass and the colder lower layers of glass prevent furnace bottom refractories reaching a temperature sufficiently high for rapid chemical attack and erosion.

Melting, refining and conditioning are all time and temperature dependent; maximum temperatures being limited by the ability of the furnace refractories to withstand these temperatures, and the time spent by the glass in any particular zone being limited by the furnace geometry. Thus for any particular design of furnace there is a maximum output above which deterioration in glass quality will arise.

Even when operating a tank within its designated limits, it is sometimes difficult to obtain completely homogeneous glass free from undissolved solids and gases and uniform in composition; the problem becomes greater as the output of the tank is increased. Glass, varying in composition, forms layers in the tank, these layers being subject to convective and other flows imposed by the furnace operation, design and other physical operations carried out on the glass. In general, in the final product, the layers are parallel to the glass surface but there may be deviation from this parallel state in areas subjected to a change in flow conditions, e.g. in the centre region of a ribbon of glass. Where the layers cease to be parallel to the faces of the glass, optical faults occur.

Various means are available for improving this situation, for example, improving the thermal efficiency by insulating the furnace structure, using improved refractory materials to reduce corrosion and erosion, changing glass composition so that less heat is required to melt and refine the glass, or changing methods of supplying heat to the glass to improve the effectiveness of this heat. However, it is generally found that additional output from a furnace cannot be achieved without increased cost, reduced furnace life or a deterioration in glass properties.

SUMMARY OF THE INVENTION

The invention provides a glass melting tank comprising an elongated tank body for containing molten glass, said tank having an inlet end for receiving glass forming material, a melting region adjacent the inlet end for melting the glass forming material, a refining region downstream of the melting region for refining the molten glass and a conditioning zone adjacent an outlet end of the tank for conditioning glass prior to the glass leaving the tank for use in a forming process, the tank having a relatively wide body portion adjacent the inlet end and the remainder of the tank leading to the outlet end providing a glass flow path which is narrow relative to said wider body portion, the said remainder of the tank having an upstream region adjacent the wide portion of the tank in which return flows occur toward the wide body portion and a downstream region, leading to the outlet of the tank, which has a raised base thereby providing a shallow channel along which the molten glass may flow in the direction of the outlet with substantially no return flow, said tank further comprising flow control means for regulating the forward flow of molten glass into the said remainder of the tank from the wide body portion.

The rate of output from a glass tank can be varied within certain designed limits, but for the best quality glass substantially the same glass level within the tank must be maintained, no matter what the output. Output may be increased by increasing the heat input to the tank and/or causing an increase in the area of the tank which is utilised for melting but the latter, for a particular tank, will be at the expense of the areas available for refining. Such changes will cause changes in the quantity, volume and possibly the depth of both the forward and return flows in the tank. The resultant effect of an increase in output is to increase the quantity of heat being carried forward in the forward flowing glass. This means that the forward flowing glass must be cooled more as the output is increased to reduce it to a suitable temperature for the forming process in which it is to be fed. There is also a limit to the amount of surface cooling that can be applied (and hence a limit to output) without causing instability in the upper glass layers due to the surface of the glass being cooled to a lower temperature than the temperature in the layers of glass below the surface. Such temperature inversion can result in currents within the glass which reduce the quality of the finished glass by causing defects visible to the eye. Previous attempts to overcome the problems of avoiding excessive surface cooling while still increasing the output of a tank have been based either on reducing convective flows e.g. by interfering with the path of the return current by e.g. placing a physical barrier in its path, or cooling the already slow moving return flow of glass and further decreasing its convective flow velocity. Such techniques do not allow materially an increase in the output of the furnaces for which they have been proposed. We have found however that in the tank of the present invention, by providing means to control the forward flow of molten glass from the wide body portion into the narrow remainder of the tank, and at the same time reducing the path length over which the return flow can occur, more heat becomes available in the melting and refining end of the furnace as the returning glass has not lost as much heat as it would were it allowed to flow to the or near to the natural limit of its convective path. Controlling the forward flow similarly reduces the rate at which heat is being transferred from the melting and refining end to the conditioning end of the tank. There is thus a more efficient use of energy as more heat becomes available for melting and refining which was formerly needed to raise the temperature of the colder return flow of molten glass. In addition, because the barrier causes a reduction in the speed of the upstream forward flowing glass more time is available to absorb heat. As less heat is transferred from the wide to the narrow portion of the tank relatively less cooling is required in the conditioning zone as only forwardly moving glass passes through the conditioning zone and is thereby subjected to the cooling operation. This improves the overall thermal efficiency and enables the conditioning zone to be shorter, for a given tank load, than was previously the case. This has the further advantage that for a given overall tank length, a greater part of the tank may, with the present invention, be used for melting and refining thereby assisting in increasing the tank output load for a given overall tank size.

We have also found that in a further embodiment of our invention, by providing within the narrow body portion means to improve the compositional and thermal homogeneity of the glass, we both increase the output and improve the glass quality at that output while still using the same or a smaller furnace than previously. It is thus possible to obtain a reduction not only in capital expenditure but also in operational costs.

The glass entering the conditioning zone is in a state which after further cooling makes it suitable for feeding into a forming process such as the float process. The use of a narrow conditioning channel with only forward flow limits the undesirable convective circulations in comparison with a wide, deep conventional conditioning portion of a glass tank, and enables greater control (by conventional means) of those circulations which do arise. This has the desirable effect of enabling conditioning to be carried out with less risk of incurring losses due to optical faults in the glass arising from deviations from parallel flow during conditioning.

The remainder of the tank which is relatively narrow may be of uniform width along its length or may have sections of different width, all sections being narrow relative to the wide body portion.

The tank may include more than one relatively narrow glass flow channels leading from the wide body portion to the outlet end of the tank.

Preferably the flow control means comprises a barrier arranged to be located in the molten glass so as to control the forward flow of molten glass into the said remainder of the tank. The barrier preferably comprises a fluid cooled barrier, e.g. water cooled, extending horizontally across the centre of the glass flow path and is located adjacent or within the deep upstream section of the narrow remainder of the tank, the barrier being positioned at a height above the bottom of the tank so as to be located in the forward flowing upper region of the molten glass; the barrier may project above the surface of the molten glass, or in some cases it may be desirable for the upper surface of the barrier to be in the same plane as the surface of the molten glass.

The barrier is preferably supported adjacent its ends in a frame or other support outside the tank structure and may be adjusted for position, e.g. height and longitudinal position within the glass.

The barrier may extend perpendicular to the flow of molten glass through the narrow channel or may be inclined at some other angle to the direction of flow.

The barrier may be in the form of a water cooled pipe, and in this form will also act to cool the forward flowing molten glass.

Preferably a vertical step is provided in the tank base at the junction of the said upstream and downstream regions of the said remainder of the tank. Although a gradual change in depth is undesirable, a steep slope may be used in some cases.

The length of the tank along which return flow of glass occurs is limited by the position of the step as there will be some return flow upstream of the step but once substantially past this position all the molten glass will flow forwardly. It will therefore be seen that by providing the step the return flow path is shorter than would be the case for a conventional deep conditioning section since the flow path has not been allowed to extend to its natural limit in the colder areas of the tank, and the returning glass is consequently hotter.

It may be found that in fact for a particular tank at a particular stage in its life, or for a particular design of tank, it is necessary to reduce the temperature of the returning glass because the effect of the shortening of the flow path has made the returning glass hotter than is acceptable. This can be done in two ways dependent on the stage at which the problem is recognised (1) by using a high conductivity refractory for the base of the relatively narrow portion of the tank in which return flows occur so as to permit heat loss through that refractory, or (2) by placing cooling means such as a water pipe in the return flow. This will reduce the overall fuel efficiency, but such a reduction may be necessary in order to prevent a fall in glass quality due to a too hot return flow.

Preferably cooling means is provided for reducing the temperature of the forward flow of molten glass in the upstream region of the narrow remainder of the tank. Preferably homogenising means is provided for homogenising the forward flow of glass in the upstream region of the narrow portion. The same means may be used for both cooling and homogenising.

Preferably the means for homogenising the forward flow of molten glass comprises at least one bank of stirrers, the or each bank containing one or more stirrers mounted side by side within the deep part of the remainder of the tank for rotation about vertical axes, said stirrers being connected to drive means and arranged to stir the molten glass so that at least in one position in each revolution of the stirrers there is no angular difference between the rotational settings of the stirrers in any one bank. The position where the angular difference is zero may be different for each bank of stirrers, when more than one bank is provided.

The stirrers may include blades or paddles. The stirrers in any bank may be arranged to rotate in the same direction so that the blades or paddles of different stirrers remain parallel to each other during rotation and in this case the stirrers are maintained in phase. If the stirrers in any bank are rotated in opposite directions they are arranged so that all the blades or paddles become parallel to each other at one predetermined position during each revolution so that there is no difference in rotational setting at that position. Alternatively the stirrers may comprise cylindrical members, such as cylindrical stalks, which are symmetrical about the axes of rotation. In this case the stirrers do not exhibit differences of rotational settings regardless of their rotational positions. In all cases the stirrers are designed so that they do not impart to the glass a substantial vertical component of glass flow.

Preferably some or all the stirrers are liquid cooled. Conveniently the liquid used is water.

Preferably the stirrers are located in the deep narrow portion at a position downstream of the barrier.

Further cooling of the glass where necessary to bring it to a temperature below which it is not degraded in quality in its passage through the subsequent shallow channel may be achieved by one or more banks of fluid cooled stirrers or by fluid cooled fingers immersed in the forward flow of glass adjacent the step in the narrow portion of the tank or within the shallow channel, the fingers being arranged so as to be able to reciprocate across the line of glass flow. The coolers are designed so that they do not impart to the glass a substantial vertical component of glass flow. In some cases it may be desirable to keep the cooling means stationary, i.e. the stirrers are not rotated and the fingers do not reciprocate.

The invention also provides a method of manufacturing glass comprising feeding glass forming material into one end of a glass melting tank, melting the material in a melting zone of the tank adjacent an inlet end of the tank, refining the molten material at a position downstream of the melting zone, and conditioning the molten glass adjacent an outlet end of the tank so that the molten glass leaves the tank ready for use in a forming process, said method further comprising causing the molten glass to pass from an inlet end of a glass melting tank through a wide body portion and subsequently through a relatively narrow channel to the outlet end, causing temperature gradients within the melting and refining zones such that there are forward and return flows of molten glass in the melting and refining zones, limiting the downstream position of the return flow by a step in the base of the narrow channel which separates a relatively shallow downstream region of the channel from an upstream entrance region of the channel and further regulating the forward flow of molten glass into the upstream entrance region by flow control means, so that the glass enters the shallow downstream region at a temperature suitable for conditioning and flows in the direction of the outlet with substantially no return flow in the shallow downstream region.

Preferably the forward flow of molten glass is cooled in the upstream entrance region of the narrow channel.

Preferably the forward flow of molten glass into the upstream region of the narrow channel is controlled by a barrier located in the molten glass and extending across the forward flow.

Preferably the forward glass flow into the narrow channel is controlled by a water cooled barrier extending across the forward flow of molten glass, this barrier also removing heat from the forward flowing glass.

The cooled barrier acts as a physical barrier controlling the forward flow of molten glass; the forward speed of the upper layers of molten glass is reduced so that this glass remains in the refining areas for a longer time and refining is more readily accomplished permitting if desired a reduction in length of refining zone and consequent increase in length of melting zone giving fewer bubbles and/or fewer partially melted raw materials in the final product; or alternatively the output of the tank may be increased for the same glass quality. Additionally the barrier sets up secondary circulating currents in the refining zone so that molten glass which would otherwise have returned in the lower layers from a colder area downstream of the barrier, returns at an earlier stage and consequently is hotter, so that less heat is required from the heat input system for adequate refining. A further consequence of using the barrier is that heat, which would have passed into the conditioning zone in the forward glass flow, is prevented from so doing, thereby further reducing the amount of cooling necessary in this zone for conditioning the glass, enabling a shorter conditioning zone to be used or allowing an increase in output for the same length of conditioning zone. The depth of barrier in the molten glass is closely adjusted and controlled so that it is effective in the upper layers of glass without substantially restricting return flow in the lower layers of glass originating downstream of the barrier. For any particular tank the depths of the forwrd and return flows are dependent upon the tank output and tank operating conditions and adjustment of barrier depth is necessary when these conditions change, for some changes in conditions it may even be necessary to replace the barrier by one of different dimensions.

The barrier is placed so as to prevent glass flow across the top of it so that not only does it act to control the forward flow and modify the circulating lower flows, but it also skims off any contaminating material on the surface of the glass and this may be removed periodically from the sides of the tank or when the barrier is replaced.

Preferably the method includes homogenising the molten glass in the upstream entrance region of the narrow channel.

Stirrers may be positioned at a predetermined position relative to the barrier so as to achieve optimum homogenisation dependent upon tank output and operating conditions, the depth of immersion being such as to attenuate the forward moving layers of molten glass without substantially penetrating the lower layers of return flow. The stirrers attenuate the layers of forward flowing glass without imposing on these layers any substantial vertical component of glass flow. By attenuating the layers of glass the influence of differences in composition between adjacent layers on the optical properties of the final product is reduced and the reduction in the thickness of the layers at a suitable temperature enables more rapid diffusion of glass between the layers which reduces these composition differences. The design of the stirrers and positioning of the stirrers is chosen to ensure the minimum of transfer of glass in a vertical direction, particularly of that glass from the return flow, so that the glass layers remain parallel to each other and to the free surface of the molten glass and glass from the colder lower layers does not adversely affect the thermal homogeneity.

Before passing into the shallow region of the narrow channel the forward flowing glass may be further cooled. This may be achieved by rotating cylindrical fluid cooled stalks in the forward flow of glass thereby cooling the glass and improving the uniformity of temperature. The depth of immersion of these fluid cooled stalks in the glass is preferably arranged so that their lower ends do not substantially affect the return flow; the depth of immersion in this case may be different from that described for the preceding stirrers and may be arranged to control the temperature gradient throughout the depth of the molten glass.

Alternatively or additionally the cooling may be achieved by reciprocating fluid cooled fingers across the flow of forward moving glass without substantial penetration of the return flow.

The shallow region of the narrow body portion of the tank is designed to achieve further cooling of the glass as is flows along the channel without introducing convective flows which would adversely affect the glass quality or instabilities in the flow leading to inversion.

The temperatures drop along this section of the tank may be as small as 50° C or as high as 200° C. In order to accommodate such changes the shallow region may be provided with adjustable insulation along its bottom and sides and burners operating above the glass surface. Means may also be provided to blow cooling air across the glass surface and/or along the underside of the base of the channel when additional cooling is required.

The rate of cooling and the temperature gradients at any cross section of the glass within this narrow section may be controlled by burners operating adjacent the side walls to heat up the edges of the glass and variable radiation slots in the roof of the narrow section to cool the centre, both burners and radiation slots being controlled manually to give the desired temperature conditions or they may be controlled automatically, responding to signals from temperature sensors positioned in the glass and/or within the chamber above the glass surface.

DESCRIPTION OF THE PREFERRED EMBODIMENTS

Figure 1:
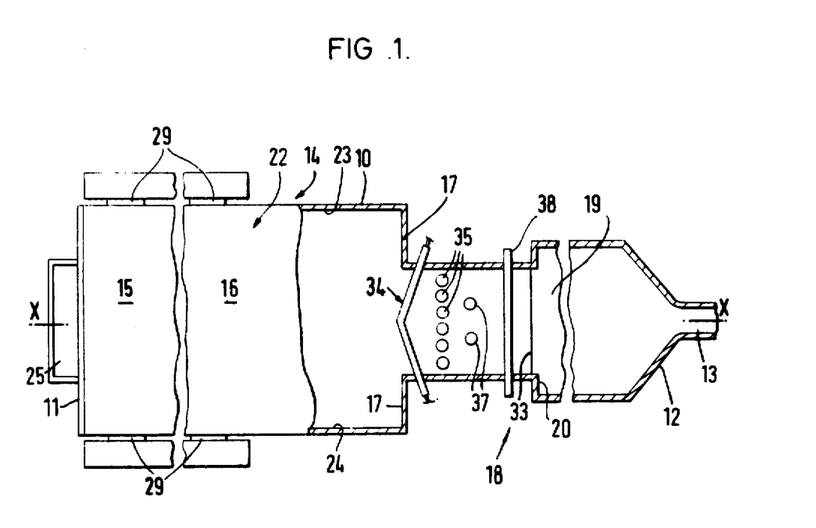
FIG. 1 is a schematic plan view of one form of glass melting tank in accordance with the present invention.
Figure 2:
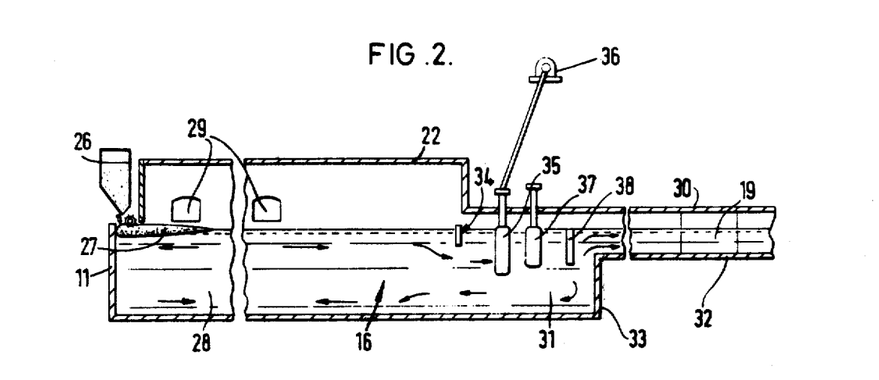
FIG. 2 is a section on the line X—X of FIG. 1.

FIGS. 1 and 2 show a glass melting tank for use in the manufacture of glass. The tank comprises an elongated body 10 formed of refractory material for containing molten glass. The tank has an inlet end 11 for receiving glass forming batch material and an outlet end 12 from which molten glass is taken along an outlet canal 13 to a forming process, such as a float unit (not shown). The glass melting tank has a relatively wide body portion 14 adjacent the inlet end 11, the wide body portion 14 providing a melting zone 15 and a refining zone 16. The wide body portion terminates at a wall 17 and the remainder 18 of the tank leading to the outlet end 12 provides a relatively narrow glass flow path to the outlet end. Although the narrow portion 18 has sections of different width, each section is narrow relative to the wide body portion 14. The narrow portion 18 provides a conditioning zone 19 for conditioning the glass before leaving the tank, The wide body portion 14 is of generally rectangular construction and there is a sharp step effecting the reduction in tank body with at the junction of the wide portion 14 and the remainder 18. The remaining portion 18 has parallel side walls with a sharp step 20 altering the width of the narrow portion 18. The outlet end of the narrow portion 18 has a tapered region 21 leading to the outlet canal 13.

As is shown in FIGS. 1 and 2, the wide portion of the tank body has a roof or crown 22, side walls 23 and 24, an inlet end wall 11 and an opposite end wall 17 adjacent the narrow portion 18. The inlet end wall 11 is provided with a filling pocket 25 into which solid glass forming batch material is fed from a feed device 26. The batch material forms a solid blanket 27 floating on the surface of the molten glass 28. The batch is progressively melted in the melting zone 15 by burners mounted in or close to ports 29 opening into the melting and refining zones above the level of molten glass on opposite sides of the tank. After melting the glass passes downstream to the refining zone 16 where the glass is refined. The glass subsequently passes into the narrow remainder of the tank 18 through the conditioning zone 19 and out to a forming process through the outlet canal 13. As is shown in FIG. 2, the remainder of the tank 18 has a lower roof 30. Furthermore, the base of the narrow remainder 18 is stepped to provide two different depth levels along the portion 18 of the tank. The upstream or entrance region 31 has a base at the same level as the base of the wide tank portion 14 thereby providing the same depth of molten glass. However, the downstream or conditioning zone 19 has a raised base 32 with a sharp vertical step 33 at the junction of the upstream and downstream regions 31 and 32. This provides a relatively shallow channel for the glass flow through the conditioning zone 19. A shallow transverse water cooled barrier 34 is located in the body of molten glass adjacent the junction of the wide body portion 14 with the narrow remainder 18. This barrier may consist of two water cooled pipes extending in from opposite sides of the tank, each pipe being in the form of a rectangular U with the two arms substantially touching each other. Downstream of the barrier 34 and still within the region 31 are located six stirrers 35 arranged side by side so as to extend across the glass flow channel. The stirrers are rotatable about vertical axes by a common drive motor 36. As is shown in FIGS. 1 and 2, downstream of the stirrers 35 and within the region 31 are located two water cooled cylindrical coolers 37 arranged side by side so as to extend across the deep part of the narrow glass flow channel. These coolers 37 are arranged to be rotated simultaneously about vertical axes by a drive motor (not shown). In the arrangement shown in this example the enlarged cylindrical lower end of each cooler is submerged in the upper part of the molten glass which flows forwards into the relatively shallow conditioning zone 19. Cooling water is passed continuously through the collers while the coolers are rotated. Each cooler 37 may be adjusted for depth of immersion and lateral position by mechanisms (not shown) outside the tank so that the temperature profile through the depth and cross the width of the glass may be brought to desired profiles before the glass enters the conditioning zone 19. In the arrangement shown in FIGS. 1 and 2, a second water cooled barrier 38 extends across the narrow portion 16 between the coolers 37 and the step 33. The barrier 38 is generally similar to the barrier 34 although it extends more deeply into the molten glass.

Figure 3:
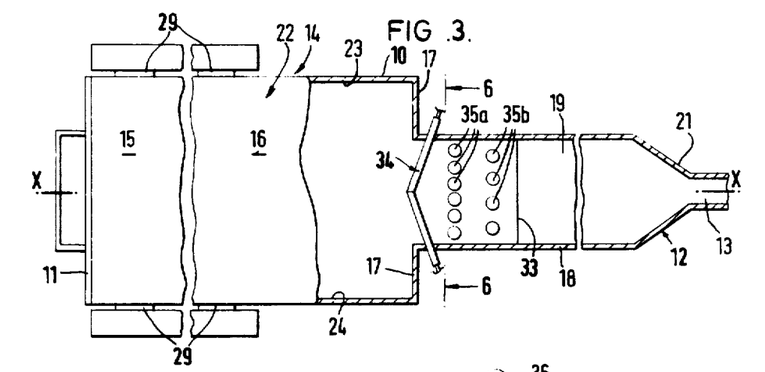
FIG. 3 is a schematic plan view of an alternative embodiment of a glass melting tank in accordance with the present invention.
Figure 4:
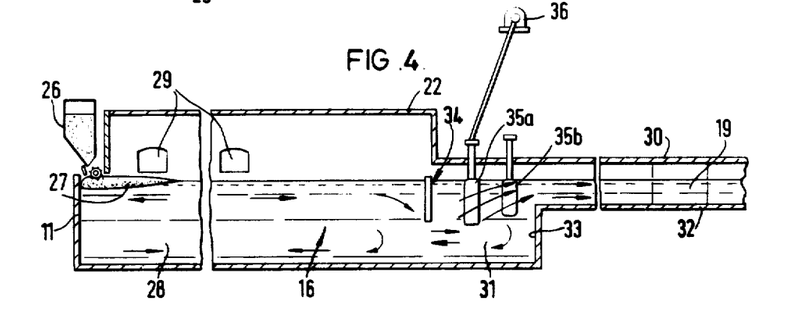
FIG. 4 is a section on the line X—X in FIG. 3.
Figure 6:
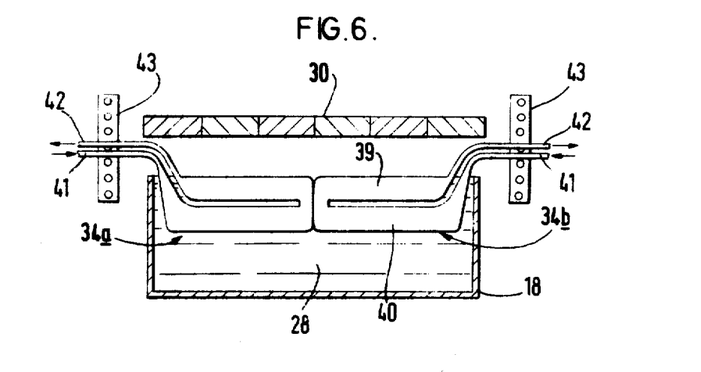
FIG. 6 shows a vertical section through the tank of FIG. 3 on the line 6—6.
Figure 7:
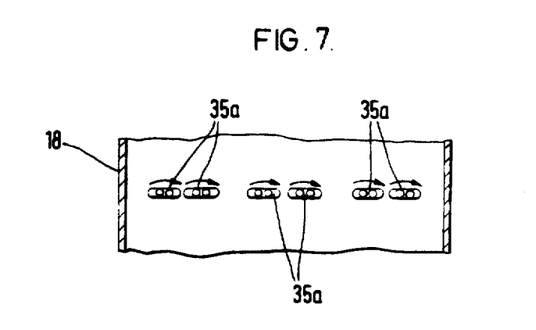
FIG. 7 shows diagrammatically the directions of rotations of a bank of stirrers in the glass melting tank of FIG. 1, FIGS. 8 and 9 show alternative forms of stirrer for use in the tank of stirrer for use in the tank of FIGS. 1 and 3, FIG. 10 show alternative arrangements which may be used in the tanks of FIGS. 1 or 3, FIGS. 11 and 12 show alternative arrangements of dual outlet channels which may be used with tanks of FIGS. 1 or 3.
Figure 8:
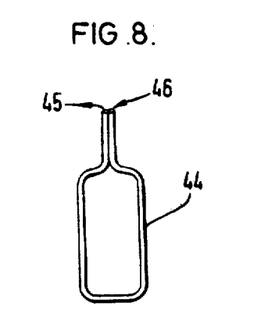
Figure 9:
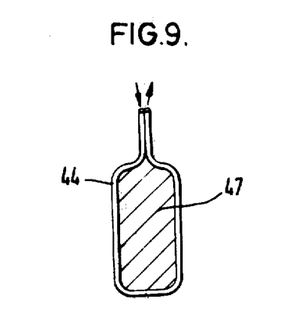

The alternative construction of glass melting tank shown in FIGS. 3 and 4 is generally similar to that described with reference to FIGS. 1 and 2 and similar parts have been marked with similar reference numerals. However, in the examples shown in FIGS. 3 and 4 the relatively narrow portion 18 of the tank is of uniform width from the wall 17 to the outlet end 12 of the tank. Furthermore, in the arrangement of FIGS. 3 and 4, the second water cooled barrier 38 is omitted and the barrier 34 adjacent the wall 17 of the tank extends more deeply into the molten glass as is shown in FIG. 6. The barrier 34 consists of two water cooled pipes extending in from opposite sides of the tank each pipe being in the form of a rectangular U with the two arms substantially touching each other as shown in FIG. 6. The two pipes are marked 34a and 34b, the horizontal arms of each pipe being marked 39 and 40, one above the other. The arm 40 is fed by an inlet pipe 41 whereas the arm 39 is connected to an outlet pipe 42. The pipes 41 and 42 are adjustably fixed to adjustable supporting devices 43 located outside opposite side walls of the tank. As is shown in FIG. 6, the pipes 34a and 34b are positioned at a height above the bottom of the tank so as to be located in the upper regions of the molten glass. As can be seen from FIG. 3, the two pipes touch in the middle of the tank and are inclined in opposite directions to a line transverse to the tank so that the central region of the barrier is located closer to the inlet end of the tank. In the arrangement shown in FIG. 3, two rows of stirrers 35a and 35b are provided, the row of stirrers 34b including four stirrers side by side. The stirrers used in the examples of FIGS. 1 and 3 may be the same in each case and each has a blade or paddle at its lower end, the paddle being located in the upper regions of the molten glass. As is shown in FIG. 7, the blades on each stirrer 35a are arranged parallel to each other and the drive motor is arranged so that all the stirrers are rotated in the same direction and at the same speed so that they are maintained in phase with each other. The stirrers are each water cooled and two alternative constructions are shown in FIGS. 8 and 9. In the arrangement shown in FIG. 8 each stirrer consists of a hollow loop formed by a tube 44 connecting an outlet 45 with an inlet 46. FIG. 9 shows an alternative construction in which the space enclosed by the hollow loop is filled with a central plate 47. The stirrers are cooled by the passage of water through the hollow tube.

The tank shown in FIGS. 3 and 4 is otherwise the same as has previously been described with reference to FIGS. 1 and 2. The operation of the tanks will now be described with reference to the example shown in FIG. 3. Heat applied adjacent the melting zone 15 melts the batch material and establishes a rising temperature gradient on moving downstream from the inlet end 11. The rising temperature gradient leads to a hot spot of maximum temperature in the molten glass downstream of the melting zone. In the refining zone the temperatures are controlled to maintain a falling temperature gradient on moving downstream away from the hot spot. These temperature gradients give rise to foward and return flows in the body of molten glass and these are indicated in FIG. 4. In the refining zone 16 there is a forward flow of hot glass in the upper regions of the glass and a return flow towards the inlet end near the bottom of the tank. This return flow is at a lower temperature than the upper glass in the refining zone and tends to protect the refractories at the bottom of the tank. Furthermore the return of hot glass from the hot spot towards the melting zone provides additional heat for melting the incoming batch material. The depth of the conditioning zone 19 is relatively shallow and a tank is operated so that the glass flow through the conditioning zone is towards the outlet 12. In this way, there is no return flow through the conditioning zone back towards the refining zone 16. The flow paths in the region 31 at the entrance to the shallow channel 18 are indicated in FIG. 4. Similarly the flow paths are marked in FIG. 2. The water cooled barrier 34 is located at a height such that the barrier controls the forward flow of the upper levels of glass into the narrow channel 18. The barrier does not project low enough to restrict appreciably the return flow at the bottom of the tank from the region 31 back to the refining zone 16. Similarly the stirrers 35a and 35b are arranged to act on the forward flow only of glass passing to the conditioning zone 19. The return flow from the step 33 back towards the refining zone 16 passes below the stirrers 35a and 35b.

It will be appreciated that the barrier 34 (and the barrier 38 in the example shown in FIG. 1) acts as a physical barrier regulating the forward flow of molten glass out of the refining zone 16. The forward speed of the upper layers of molten glass is reduced so that more time is available for the glass to absorb adequate heat and achieve satisfactory refining in the refining area of the tank. Furthermore, the barrier sets up secondary circulating currents in the refining zone so that molten glass is returned along a return flow path from the region of the barrier rather than from a colder area downstream of the barrier. By causing this return flow from an earlier stage in the tank, the return glass is hotter so that less heat is required from the burners to achieve satisfactory melting and refining. Furthermore, the barrier 34 prevents some heat passing in the forward flow of glass into the conditioning zone. As the conditioning zone carries out cooling of the molten glass so that the glass is at a suitable thermal condition for the subsequent forming process, this reduces the amount of cooling necessary in the conditioning zone and enables a shorter conditioning zone to be used.

Figure 13:
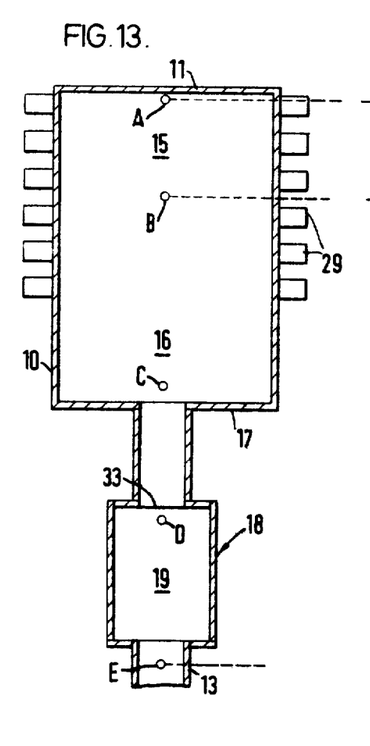
FIG. 13 shows schematically the temperature conditions in a tank in accordance with the present invention.
Figure 14:
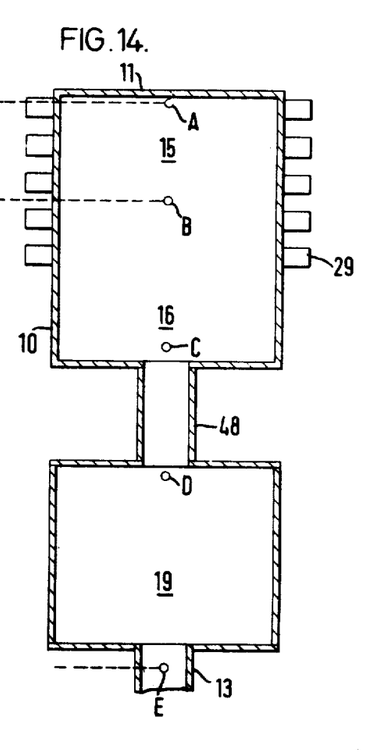
FIG. 14 shows comparable temperature conditions in a conventional tank.

This can be seen by reference to FIGS. 13 and 14 which show side by side a known tank layout with a tank in accordance with the present invention. FIG. 14 shows a known tank having a main body portion 10 extending from an inlet end 11 providing a melting zone 15 and a refining zone 16. Heat is applied through ports 29. The tank leads through a waist 48 to a conditioning zone 19 of the same width as the main tank portion 10. An outlet canal 13 is provided. The depth of glass is constant throughout the melting, refining and conditioning zones. FIG. 13 on the other hand shows schematically a tank in accordance with the present invention having the same overall length as the tank shown in FIG. 14. However, the main body portion 10 leads to a downstream section 18, leading to the outlet canal 13 which is narrower than the main body portion 10 and has the step 33 in the base of the tank. It will be appreciated that the particular temperature conditions achieved within a glass melting tank can vary in dependence on a number of factors including for example the type of glass being produced. However, for the purpose of comparing the present invention with the results achieved in a known type of glass melting tank, a particular example has been chosen in which the glass being melted is of a soda-lime-silica composition of the kind used in producing flat glass. In the example shown in FIG. 14 glass at the inlet is heated at position A to within the range 1500° C ± 10° C and this temperature rises to within the range 1590° C ± 5° C at the hot spot B of the tank. After refining in the refining zone, the glass enters the waist 48 and the temperature may be in the range 1375° C ± 10° C at position C at the entrance to the waist. On emerging from the waist and entering the conditioning zone 19 the temperature may be in the range 1280° C ± 10° C at position D. The glass is cooled on passing through the conditioning zone and enters the outlet canal 13 in the range of 1090° C ± 10° C at position E. For the same example when using a tank in accordance with the present invention as shown in FIG. 13, the glass at the filling end is again heated to 1500° C ± 10° C at position A and rises to 1590° C ± 5° C at the hot spot B. However, in this case the refining region extends further downsttream as can be seen from the downstream displacement of the wall 17 marking the end of the wide portion of the tank 10. The glass leaving the wide portion may be at 1365° C ± 10° C at position C. On passing over the step 33 the glass may be in the range 1200° C ± 25° C at positon D. On passing through the conditioning zone it is further cooled to 1090° C ± 10° C at position E, on entering the outlet canal 13. It will therefore be seen that in accordance with the present invention the glass is more rapidly cooled between the temperatures of 1365° and 1200° C than was previously the case. This is achieved by the cooling means located in the deep portion of the narrow channel. It has also enabled considerable shortening in the distance between the wall 17 and the outlet canal 13 thereby reducing the length of the conditioning zone. For a given overall length of tank this has enabled an increase in the melting and refining areas and as can be seen from FIG. 13, this has allowed the addition of more heating ports so that a greater load can be melted and refined in the same tank length. Furthermore, in the arrangement shown in FIG. 13 the return flow of glass towards the refining zone 16 occurs from the step 33 which is at 1200° C. The temperature at the step 33 is given in the present case at 1200° C but it is possible using the cooling means described to achieve temperatures within a fairly wide range at the step. In the present case operating with a soda-lime-silica glass it is possible to cool from a refining temperature of the order of 1365° C to temperatures ranging from 1175° C to 1225° C, thus demonstrating the flexibility derived from the use of the cooling means located in the deep portion of the narrow channel. The possible range and temperature drop may of course vary to some extent with changes in the base glass composition. In the known tank illustrated in FIG. 14 such a large variation is not possible, and at the exit from the waist, a range of the order of 1270° C to 1290° C can only be achieved by an overall change in tank conditions. However, in a tank, according to the present invention, the temperature at the step can be varied within much wider limits by appropriate choice of cooling means and without any change in the overall tank operating conditions. In the known arrangement shown in FIG. 14 return flows occur from the outlet end of the conditioning zone 19 which is at a much lower temperature so that return flows returning towards the refining zone 16 come from a much colder glass region thereby requiring further reheating.

It will therefore be seen that by use of the present invention the total output which can be achieved from a glass tank of a given size can be increased compared with the results from a conventional tank of the type shown in FIG. 14. As an example of this, a tank of the type shown in FIG. 14 can be designed to produce a maximum output of 2000 tonnes/week whereas a tank of similar overall length and incorporating the present invention as shown in FIG. 13 can provide an output of 2,500 tonnes/week. Not only is the output in tonnes per week improved but the thermal efficiency (that is the amount of heat needed for a given output of molten glass) is improved. For example, if a tank in accordance with FIG. 13 is used to provide the same output in tonnes per week as the tank shown in FIG. 14, an improvement in thermal efficiency may be achieved of the order of 5 to 10%. That is an improvement by reducing the number of therms needed to produce each tonne of molten glass. The thermal efficiency achieved by use of the present invention increases as the load output of the tank is increased. If the tank shown in FIG. 13 is used to produce 2,300 tonnes/week it is estimated that the improved thermal efficiency of 15 to 20% will be achieved. If the output of the tank shown in FIG. 13 is further increased to 2,500 tonnes/week, the estimated improved thermal efficiency on the basis of the performance of the tank of FIG. 14 at 2000 tonnes will be of the order of 20 to 25%. These figures are based on the case where the maximum possible output of the tank shown in FIG. 14 is 2000 tonnes per week, hence no direct comparison can be made except at 2000 tonnes and under.

Figure 15:
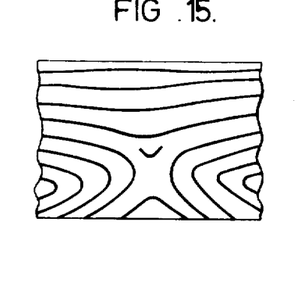
FIG. 15 is a representation, on an enlarged scale, of composition variations in the centre portion of a conventional sheet of glass.
Figure 16:
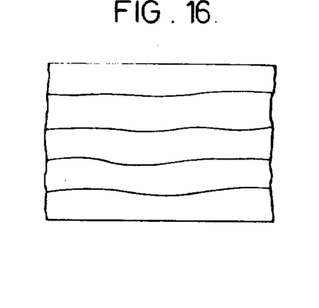
FIG. 16 is a similar representation for the centre section of glass formed by the float process after refining and conditioning in accordance with the present invention.

The present invention not only enables increased output and improvement in thermal efficiency but it also provides improved quality of glass. It is known that variations in glass compositions in the molten glass leaving a melting tank can form optical defects in glass subsequently produced. This is discussed for example in U.S. Pat. No. 3,894,859. In order to reduce optical defects to a minimum, it is desirable that any resulting layers of glass of differing composition should be as few as possible and have as little composition variation as possible and preferably the layers should be of a uniform pattern running parallel to the glass surfaces. It is however well known that an undesirable "centre feature" occurs in float glass where layers of different composition form an undesirable pattern leading to optical defects. An example of this prior art situation is shown in FIG. 15. It is however a marked contrast to the results achieved with the present invention which is shown in FIG. 16. It can be seen from FIG. 16 that the layers of glass differing in composition do not form the undesirable "centre feature" pattern which has previously been common in float glass. The layers of differing composition are substantially parallel to the glass faces and there are fewer layers of varying glass composition and the intensity of lines due to composition variation is reduced. The change in basic pattern is believed to be due to the change in flow within the body of the glass resulting from the new tank design and the reduction in number and intensity of the lines of different composition due to the stirring action on such different flows in the tank. The stirrers 35a are arranged to assist homogenisation of the glass and attenuate forward moving layers of molten glass without causing any vertical displacement of the glass flow. They also effect some cooling of the glass in the region 31 before reaching the conditioning zone.

Figure 5:
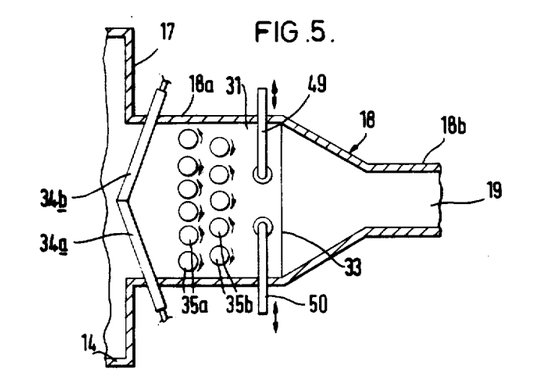
FIG. 5 is a schematic plan view of a modification of part of the glass melting tank shown in FIG. 3.

The invention is not restricted to the details of the example shown in FIGS. 1, 2, 3 and 4. For instance, the junction of the narrow portion 18 of the tank with the wide portion 14 may be modified as shown in FIG. 5. In this case the entrance region 31 of the relatively narrow section 18 has two banks of stirrers 35a and 35b the stirrers in the two banks being arranged to rotate in opposite directions. Instead of using the cylindrical coolers described with reference to FIG. 1, additional cooling is achieved in the zone 31 by use of two reciprocating water cooled fingers 49 and 50 immersed in the forward flowing glass and projecting horizontally along a transverse line across the narrow channel 18. Furthermore, in this modification the relatively narrow portion 18 has parallel sides 18a adjacent the junction with the wide portion 13. These parallel walls 18a taper inwardly from the step 33 leading to an even narrower parallel sided channel 18b. The conditioning zone 19 is provided by the tapered section as well as the narrow section 18b. The parallel narrow section 18b may be very short in this case.

Figure 10:
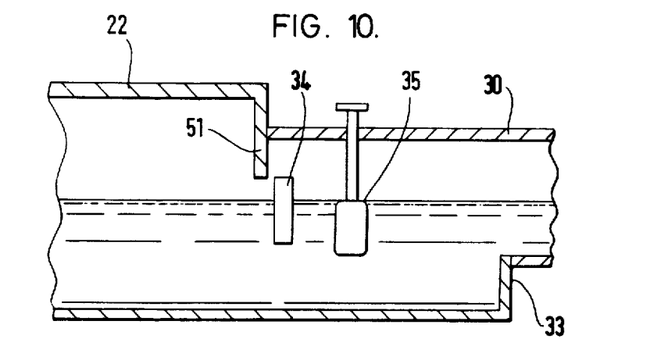

In the arrangement shown in FIGS. 2 and 4, the downward step from the roof 22 of the main part of the tank terminates at the level of the roof 30 of the narrow downstream portion 18 of the tank. It is however possible to provide a downwardly projecting wall 51 as shown in FIG. 10 at the junction of the two roof sections 22 and 30. This downwardly projecting wall 51 extends across the full width of the tank and terminates at substantially the same level as the upper edge of the water cooled barrier 34. By minimising the gap between the wall 51 and the barrier 34, it is possible to provide a form of gas seal between the refining zone 16 and the downstream section of the tank. Furthermore, the wall 51 significantly reduces radiation transfer to the cooling section thus enabling less water cooling to be used at the entrance to the narrow downstream section of the tank. A full seal may be formed by suspending a sheet of platinum metal or alloy between the lower end of the wall 51 and the molten glass surface.

Figure 11:
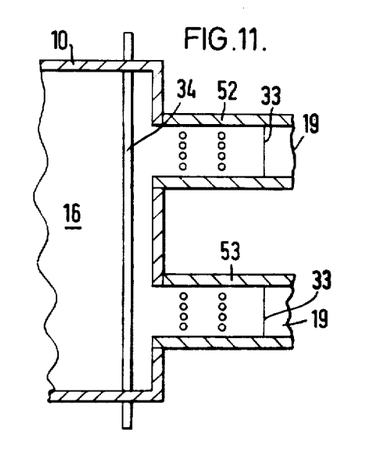
Figure 12:
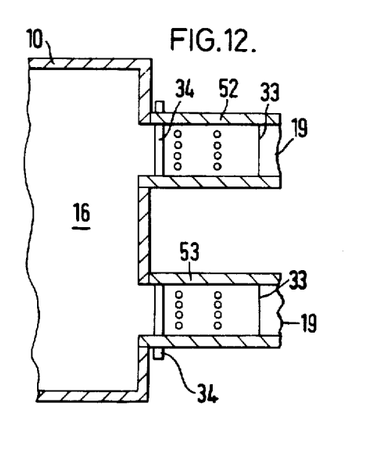

In the arrangement shown in FIGS. 1 and 3, the melting and refining part 10 of the tank is arranged to feed a single conditioning zone. It is however possible to feed two or more conditioning zones in parallel and two alternative arrangements are shown in FIGS. 11 and 12. In both these arrangements two narrow tank portions 52 and 53 extend toward the outlet end of the tank from the main body portion 10. Each of the narrow channels 52 and 53 is provided with a step 33 forming an upstream deep section and a downstream shallow section in which the flow is totally in the direction of the outlet from the tank. Each of the channels 52 and 53 has two rows of stirrers or cylindrical coolers as have been previously described with reference to FIGS. 1 and 3. In the arrangement shown in FIG. 11, the water cooled barrier comprises a horizontal water cooled pipe 34 extending across the full width of the wide body portion of the tank 10 immediately before the entrance to the narrow channels 52 and 53. The formation of the barrier 34 and its position may be similar to that previously described with reference to FIG. 1 or FIG. 3. The example shown in FIG. 12 is generally similar although in this case instead of using a large water cooled pipe 34 extending across the full width of the wide portion 10 of the tank, a separate water cooled barrier 34 is provided for each of the channels 52 and 53 the barrier being located a short distance inside the entrance to the narrow channel.

Although the barrier 34 is shown in FIGS. 2, 4 and 6 with the upper surface of the barrier in substantially the same plane as the surface of the molten glass, the upper surface of the barrier 34 may in some cases project above the surface of the glass and thereby provide a skimming device for any contaminating material on the surface of the molten glass. Although in FIG. 6 the upper and lower arms of each pipe 34 are shown parallel to each other and to the glass surface, they may be designed so that the lower and upper arms coverage or diverge towards the centre of the channel. In FIGS. 1 and 3, the barrier 34 extends horizontally across the full width of the narrow deep channel 18 and the two halves of the barrier are inclined to the transverse direction across the tank. The barrier may however be arranged at some other inclination and may in some cases extend perpendicular to the direction of flow as is shown in FIGS. 11 and 12.

Although the stirrers shown in FIGS. 8 and 9 have blades or paddles, it may be possible to use stirrers of cylindrical form with no blades or paddles in some cases. It may also be desirable in some cases to use cooling devices in the conditioning zone 19. In some cases where the conditioning zone 19 has a section downstream of the step which is wider than the section immediately upstream of the step, it may be desirable to provide edge heating elements close to the glass surface in the shallow region downstream of the step so as to decrease temperature differences between the edge and centre of the glass flow in the conditioning zone.

In the example shown in FIG. 2 the coolers 37 are arranged at a depth in the molten glass so that the lowermost end of each cooler is just above the return glass flow in the lower section of the region 31. It is however desirable that all coolers may be adjusted for depth of immersion and lateral position by mechanism outside the furnace (not shown) so that the temperature profile through the depth and across the width of the glass may be brought to desired profiles.

We have described with reference to FIG. 14 the temperatures existing at certain points in a tank operating according to the present invention. In this particular example the temperature chosen for the molten glass as it passes the step is of the order of 1200° C. The choice of which of the possible temperatures is determined by a number of factors including the tank operating conditions and the physical dimensions of the shallow downstream section into which the molten glass flows over the step. As indicated above with a soda-lime-silica glass, the temperature of the molten glass as it passes the step can be chosen from the range 1175° C to 1225° C. This range will alter to some extent with variations in glass composition. In addition to the factors mentioned above, it is necessary in choosing the temperature to which the molten glass is cooled before it reaches the step, to consider the need to avoid or substantially reduce the possibility of contamination with either bubble or refractory arising from the condition and temperature of the molten glass when it comes into contact with the refractories forming the shallow downstream portion.

The shallow section is shown with a refractory base. An alternative arrangement is to separate the glass flowing through the zone in all or part of the zone from the refractory base by providing a layer of molten metal which can be conveniently tin or one of its alloys. Care is necessary that in reducing the changes of refractory contamination in this way, the metal or its alloy is not introduced as a contaminant, and a major factor in this is the choice of the temperature to which the molten glass is cooled before it enters the shallow region.

I claim:

1. A glass melting apparatus comprising:
an elongated tank body for containing molten glass and having an inlet end for receiving glass forming material and an outlet end for glass leaving said tank body for use in a forming process, said tank body defining:
   a. a melting region adjacent said inlet end for melting the glass forming material,
   b. a refining region downstream of said melting region for refining the molten glass,
   c. a conditioning zone adjacent said outlet end for conditioning the refined glass, and
   d. an intermediate zone leading from said refining region to said conditioning zone;
said intermediate zone and said conditioning zone being substantially narrow relative to said refining region;
flow control means for physically slowing up the forward flow of the upper levels of glass out of said refining region and into said narrower intermediate and conditioning zones;
said refining region and said intermediate zone being sufficiently deep for forward and return flow of molten glass to take place;
said intermediate zone having a step at its downstream end adjacent said conditioning zone, and said conditioning zone having a raised base thereby providing a shallow conditioning channel along which molten glass may flow in the direction of said outlet with substantially no return flow.

2. A glass melting tank according to claim 1, in which the flow control means comprises a barrier arranged to be located in the molten glass.

3. A glass melting tank according to claim 2, in which the barrier comprises a water cooled barrier extending across the centre of the glass flow path.

4. A glass melting tank according to claim 2 in which the barrier is positioned at a height above the bottom of the tank so as to be located in the forward flowing upper region of the molten glass.

5. A glass melting tank according to claim 2 in which the barrier projects above the surface of the molten glass.

6. A glass melting tank according to claim 2 in which the barrier is supported adjacent its ends on support means outside the tank, said support means being adjustable to permit adjustment of the barrier position.

7. A glass melting tank according to claim 1 in which said step is a vertical step provided in the tank base.

8. A glass melting tank according to claim 2 in which in addition to the barrier, cooling means is provided for reducing the temperature of the forward flow of molten glass in said intermediate zone.

9. A glass melting tank according to claim 1 in which homogenising means is provided for homogenising the forward flow of glass in said intermediate zone.

10. A glass melting tank according to claim 9 in which said homogenising means is also arranged to provide cooling.

11. A glass melting tank according to claim 9 in which said homogenising means comprises at least one bank of stirrers mounted side by side in said intermediate zone and arranged for rotation about vertical axes.

12. A glass melting tank according to claim 11, in which said stirrers are connected to drive means arranged to stir the molten glass so that at least in one position in each revolution of the stirrers there is no angular difference between the rotational settings of the stirrers in any one bank.

13. A glass melting tank according to claim 11 in which each stirrer includes a blade.

14. A glass melting tank according to claim 11 in which at least some of the stirrers are water cooled.

15. A glass melting tank according to claim 11 in which the stirrers are located at a position downstream of the flow control means.

16. A glass melting tank according to claim 1 in which two narrow channels providing respective said intermediate and conditioning zones extend side by side from the same refining zone.

17. A method of manufacturing glass comprising feeding glass forming material into one end of a glass melting tank, melting the material in a melting zone of the tank adjacent an inlet end of the tank, refining the molten material at a refining zone downstream of the melting zone, and conditioning the molten glass in a shallow conditioning zone adjacent an outlet end of the tank so that the molten glass leaves the tank ready for use in a forming process, said method further comprising passing the molten glass from an inlet end of a glass melting tank through a wide body portion including said refining zone and subsequently through a substantially narrower channel, including said shallow conditioning zone and a deeper intermediate zone leading from said refining zone to said conditioning zone, towards the outlet end, said refining zone and said intermediate zone being sufficiently deep for forward and return flow of molten glass to take place, enforcing temperature gradients within the melting, refining and intermediate zones and enforcing forward and return flows of molten glass in the melting. refining and intermediate zones, limiting the downstream position of the return flow at a step in the base of the narrow channel at the juncture of said intermediate and conditioning zones, and further physically slowing up the forward flow of the upper levels of molten glass into the intermediate zone by flow control means, whereby the glass enters the shallow conditioning zone at a temperature suitable for conditioning and flows in the direction of the outlet with substantially no return flow in the shallow conditioning zone.

18. A method according to claim 17, in which the forward flow of molten glass is cooled in the intermediate zone.

19. A method according to claim 18, in which the glass is a soda-lime-silica glass and the forward flow of molten glass is cooled in the upstream entrance region of the narrow channel from a refining temperature of about 1365° C to a temperature at the entrance to the downstream shallow region in the range 1175° to 1225° C.

20. A method according to claim 17 in which the forward flow of molten glass into the upstream region of the narrow channel is regulated by a barrier located in the molten glass and extending across the forward flow.

21. A method according to claim 20 in which the forward glass flow into the narrow channel is regulated by a water cooled barrier extending across the forward flow of molten glass, the glass being cooled by circulation of water through the barrier.

22. A method according to claim 17 including homogenising the molten glass in the upstream entrance region of the narrow channel.

23. A method according to claim 22, in which the homogenisation is effected by rotating a plurality of stirrers about vertical axes.

* * * * *